No. 608,783. Patented Aug. 9, 1898.
E. MARKMANN.
TIDAL POWER.
(Application filed Jan. 28, 1897. Renewed Feb. 25, 1898.)
(No Model.) 4 Sheets—Sheet 1.

No. 608,783. Patented Aug. 9, 1898.
E. MARKMANN.
TIDAL POWER.
(Application filed Jan. 28, 1897. Renewed Feb. 25, 1898.)
(No Model.) 4 Sheets—Sheet 2.

WITNESSES
L. Douville,
P. F. Doyle.

INVENTOR.
Ernest Markmann
BY Joshua D. Wiedersheim
ATTORNEY

No. 608,783. Patented Aug. 9, 1898.
E. MARKMANN.
TIDAL POWER.
(Application filed Jan. 28, 1897. Renewed Feb. 25, 1898.)
(No Model.) 4 Sheets—Sheet 3.

WITNESSES
L. Orville,
P. F. Nagle.

INVENTOR.
Ernest Markmann
BY
ATTORNEY.

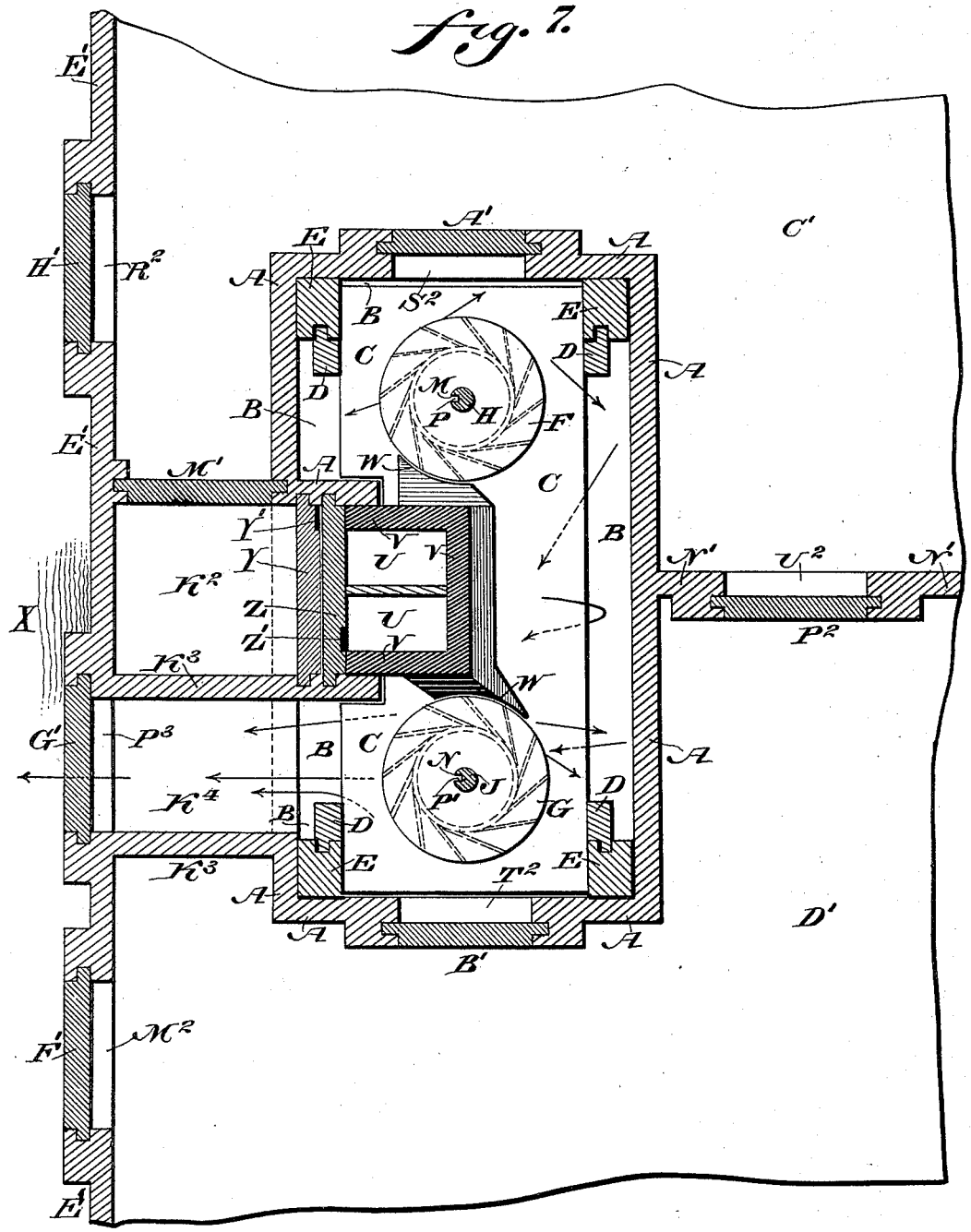

UNITED STATES PATENT OFFICE.

ERNEST MARKMANN, OF PHILADELPHIA, PENNSYLVANIA.

TIDAL POWER.

SPECIFICATION forming part of Letters Patent No. 608,783, dated August 9, 1898.

Application filed January 28, 1897. Renewed February 25, 1898. Serial No. 671,693. (No model.)

*To all whom it may concern:*

Be it known that I, ERNEST MARKMANN, a citizen of the United States, residing in the city and county of Philadelphia, State of Pennsylvania, have invented a new and useful Improvement in Tidal Powers, which improvement is fully set forth in the following specification and accompanying drawings.

My invention consists of a novel construction of apparatus for deriving power from tide-water, the novel features of which will be hereinafter set forth, and specifically pointed out in the claims.

Figure 1:
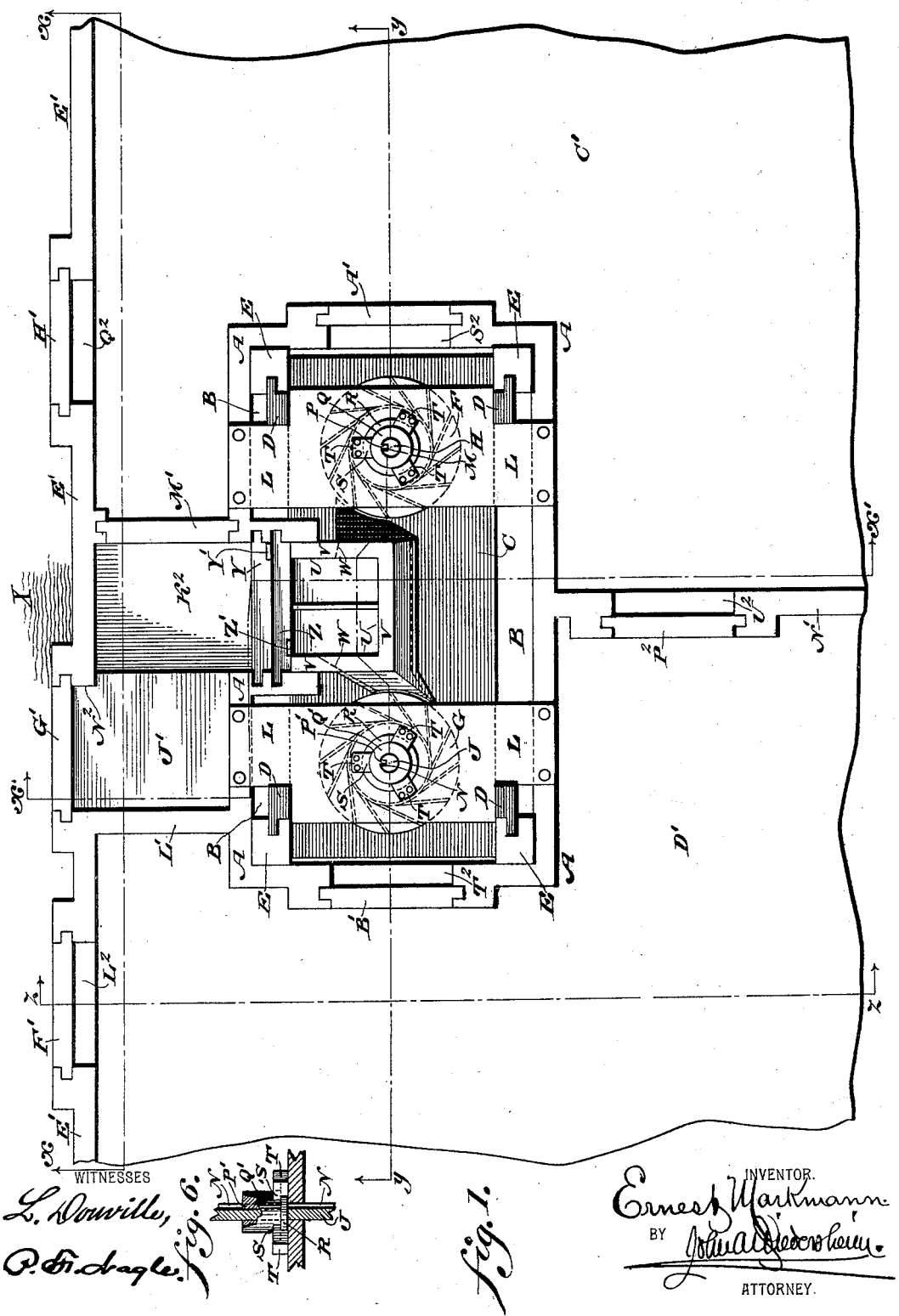
Figure 2:
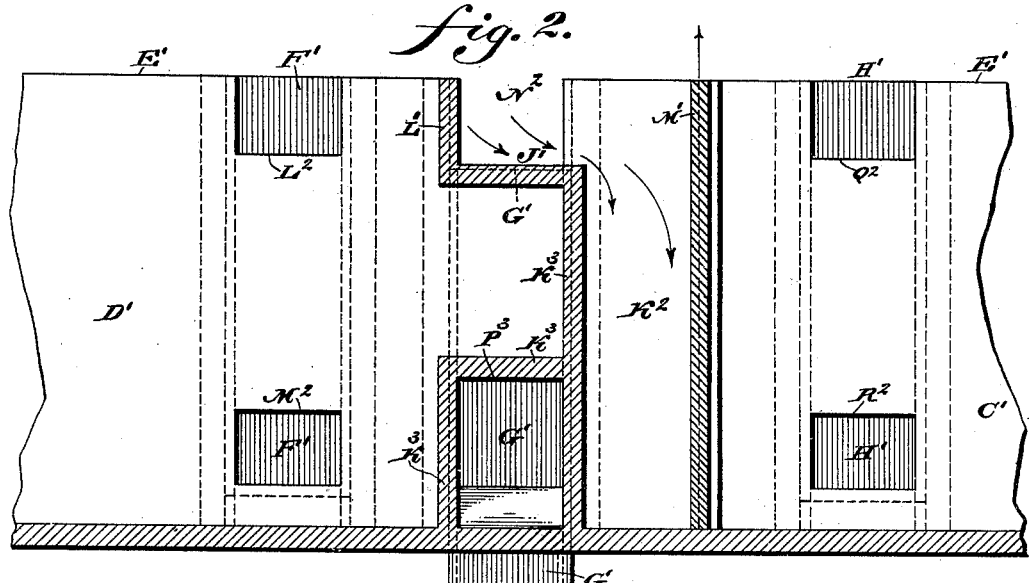
Figure 3:
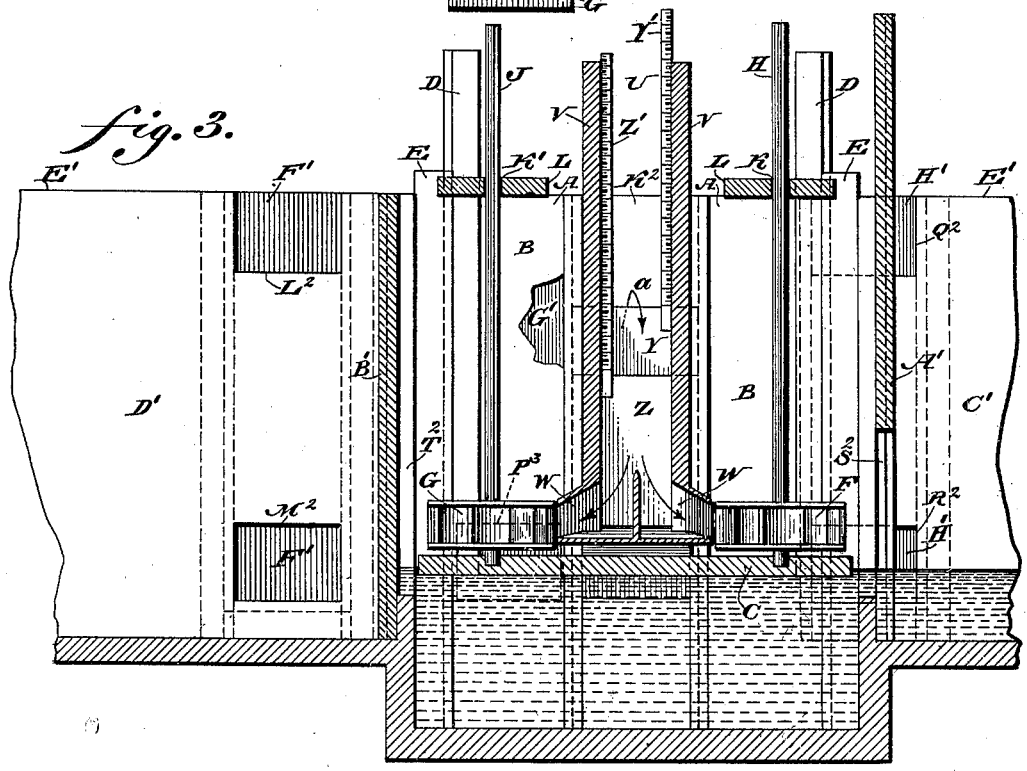
Figure 4:
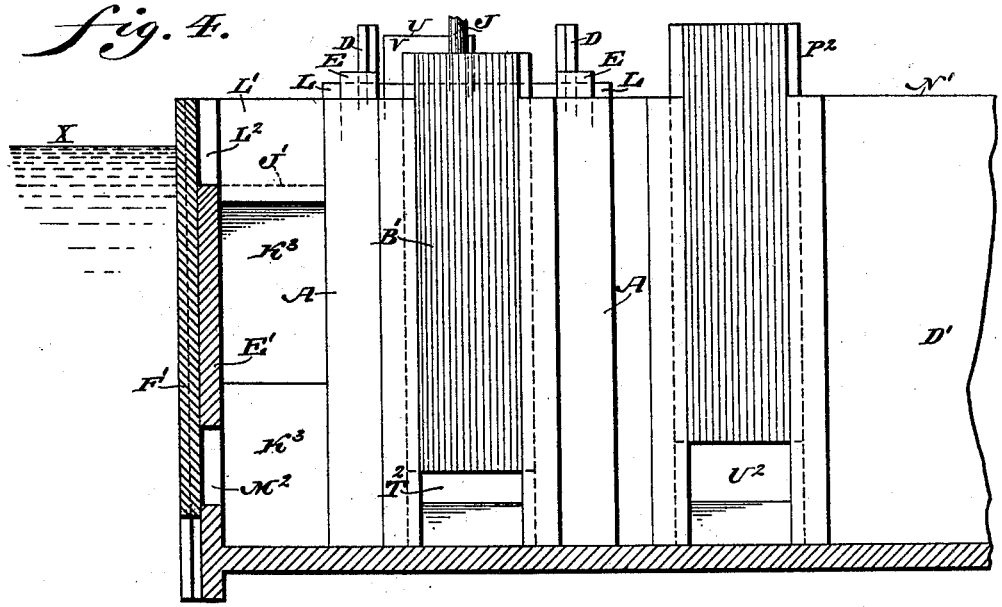
Figure 5:
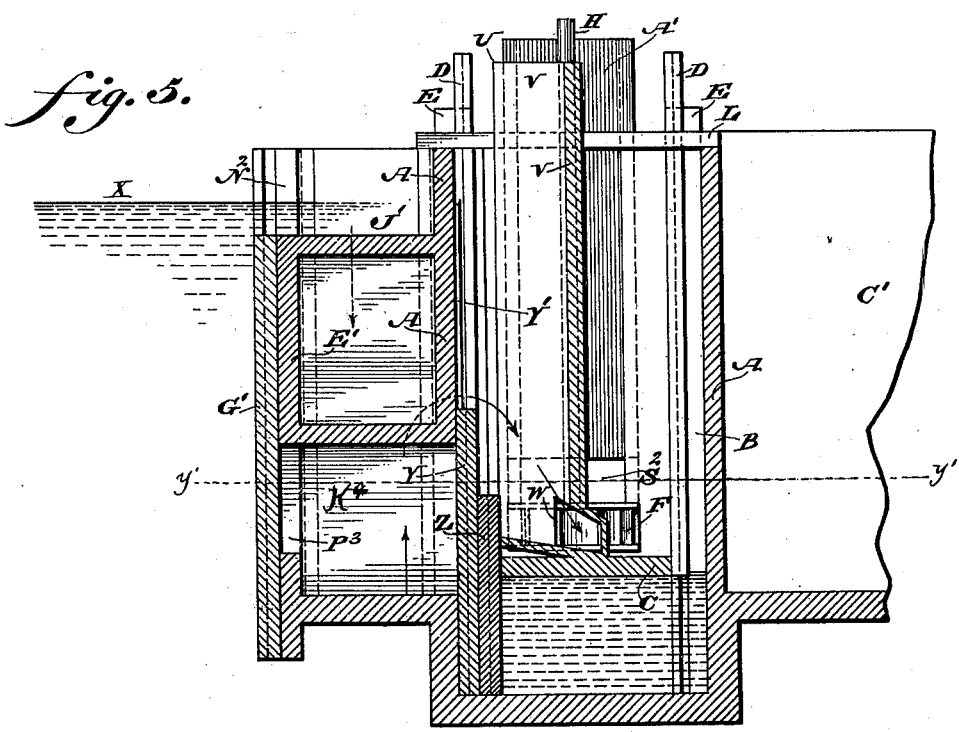

Figure 1 represents a plan view of a tidal power embodying my invention. Fig. 2 represents a vertical section on line $x\,x$, Fig. 1, on a reduced scale. Fig. 3 represents a vertical section on line $y\,y$, Fig. 1, the same scale as Fig. 2. Fig. 4 represents a vertical section on line $z\,z$, Fig. 1, same scale as Fig. 2. Fig. 5 represents a vertical section on line $x'\,x'$, Fig. 1, same scale as Fig. 2. Fig. 6 represents a partial side elevation and partial vertical section of certain detached portions of the device, same scale as Fig. 1. Fig. 7 represents a horizontal sectional view on line $y'\,y'$, Fig. 5.

Similar letters of reference indicate corresponding parts in the several figures.

Referring to the drawings, A designates walls which surround an inclosure B, within which is a float C, provided with vertical strips D, which are loosely fitted in standards E, so as to guide the float C in its rising-and-falling motions due to the varying heights of water in the inclosure B.

The float C carries in the present instance two turbines F and G, which are secured in any suitable manner to their respective shafts H and J, whose lower ends are journaled in the float C. The upper portions of the shafts H and J pass freely through openings K and K', respectively, in bridges L, which are secured to the upper portions of the walls A and serve as guides for the shafts H and J, so as to cause the two latter to remain in a vertical line when rising and falling with the varying heights of water in the inclosure B. (See more particularly Fig. 3.)

The shafts H and J are provided with longitudinal grooves M and N, respectively, into which are fitted tongues P and P' on pulleys Q and Q', respectively. The said pulleys Q and Q' are provided with collars R, which are loosely fitted under lips S in blocks T, which are secured to the bridges L and serve as guides for said pulleys and permit the latter to be rotated by their respective shafts and at the same time be prevented from moving in a vertical direction.

The pulleys Q and Q' are each intended to operate a belt, chain, &c., which may be passed around the driving-pulley of a machine of any desired description, so as to impart motion to the same.

The float C carries a chute U, which is closed in the present instance on three of its sides by the walls V and is open in that portion which faces the ocean, bay, &c., X, from which the supply of water to operate the turbines is obtained. In the lower portion of the chute U are openings W, which permit the water in said chute to escape therethrough and impinge against the turbines F and G and rotate the same, and consequently transmit motion to the mechanism to be driven by the same.

The portion of the chute U which faces the ocean, bay, &c., X is provided with gates Y and Z, which may be raised and lowered by any well-known mechanism and for the purpose of regulating the fall of water into the chute U, and which is directed by the latter to the turbines F and G.

In the walls A of the inclosure B are gates A' and B', which may be raised and lowered, so as to open and close the communication between said inclosure and the basins or reservoirs C' and D'.

The wall E' of the basins C' and D' is provided with gates F', G', and H', which may be raised and lowered by any well-known mechanism and for a purpose to be hereinafter described.

J' designates a passage which directs the water from the ocean, bay, &c., X into an inclosure $K^2$, (see Figs. 1, 2, and 7,) it being noted that said passage J' is separated from the basin D' by a wall L' and that the inclosure $K^2$ is separated from the basin C' by a gate M', which may be raised and lowered in any well-known manner and for a purpose to be hereinafter described. It will also be noted that the inclosure $K^2$ is separated from the chute U by the gates Y and Z and that the passage J' is separated from the inclosure B by a portion of the wall A. The inclosure K² is separated from the basin D' by a wall K³. (See more particularly Fig. 2.)

The basins C' and D' are separated from each other by a wall N', which is provided with a gate P², which latter when opened forms a communication between said basins C' and D' for a purpose to be hereinafter described.

K⁴ designates a passage which communicates with the chamber B and has an outlet-opening B³ in the wall E', as will be hereinafter described.

The wall E' is provided with openings L² M² N² P³ Q² R², and the walls A are provided with openings S² T², and the wall N' is provided with an opening U², the object of all of which will be hereinafter described.

No mechanism or means for operating the gates has been described, and I do not desire to limit myself to any particular construction, for any suitable means may be employed.

The operation is as follows: All the openings in the device are first closed, and about fifty-five minutes before high tide the gate G' is lowered, so as to allow the water from the ocean, bay, &c., X to pass through the opening N², as indicated by the arrow in Fig. 2, and reach the passage J', from whence it passes or falls into the inclosure K² and gradually rises therein. In the meanwhile the gates Y and Z, which are between the inclosure K² and the inclosure or chamber B, are adjusted at a desired height, and when the water in the said inclosure K² has risen sufficiently it reaches the top of the upper gate Y and overflows into the chute U, through which it passes and escapes through the openings W, which are in the lower portion of the chute U, and operates the turbines F and G, which latter are situated at the mouth of the passage W, it being noted that as the inclosure B fills with water the float C rises therein and carries with it the various parts which are mounted thereon. After the water has reached a certain height in the inclosure B the gate A', which is between the said inclosure and the basin C', is opened, and the water passes through the opening S² into the said basin and gradually rises therein. At high tide the basin C' is almost full of water and the gate A' is closed, thus shutting off the communication between the inclosure B and the basin C'. The gate H', which is between the ocean, bay, &c., X and the said chamber, is now lowered, so as to permit the water from the ocean, bay, &c., X to enter the basin C' and fill the same to its full capacity. It is desirable that the gate M' should be opened at about the same time as the gate H', so that the water in the inclosure K² and in the basin C' is on a level. When the basin C' is filled with water to its full extent, the gates H' and M' are closed, thus shutting off all communication with said basin. The gate B' is now opened, and the water in passing in the opening N² enters the inclosure K² and through the chute into the inclosure B will pass out the same through the opening T² and into the basin D'. The water will gradually lower in the inclosure B, and the float C will fall therewith. The water in the basin D' meanwhile rises until the same is nearly on a level with that of the ocean, bay, &c., X. The gate B' is then closed, and the gate F' is lowered, so as to permit water from the ocean, bay, &c., to enter the basin D' through the opening L² until the same are on a level. The turbines are now inoperative and remain so until about eighty-five minutes before low tide. The gate G' is then raised, so as to permit the water in the inclosure B to pass through the passage K⁴ and opening P³ and return to the ocean, bay, &c., X. This will cause the float C and the parts carried to be lowered. The gate M' is now raised, and the water from the basin C' passes into the inclosure K² and then rises therein until it flows over the gates Y and Z, thus entering the chute and being directed to the turbines F and G, which are operated, and said water enters the chamber B, from which it escapes through the said passage K⁴ and through the opening P³ under the gate G' into the ocean, sea, bay, &c., X. As the water in the basin C' lowers the gate P² is opened by raising the same, and the water in the basin D' enters the basin C' through the opening beneath said gate P². After the water in the basins C' and D' becomes so shallow that it cannot overflow the gate Y the turbines will cease to work, and when this point has been reached the gates F' and H' are raised to permit the remaining water in the basins C' and D' to pass through the openings M² and R² and return to the ocean, bay, &c., X, after which the gates are again closed and the parts are once more ready for the operation, as hereinbefore described.

It will be noticed that the gates Y and Z are each provided with a scale and measure Y' and Z', respectively, to indicate the position of the said gates relative to some fixed point. Attention is further called to the fact that when the gate G' is first opened the flow of water will not be very large, but it will have a much greater fall than when the tide is higher and more water is coming in, at which time the float has risen and the fall will not be so great.

Having thus described my invention, what I claim as new, and desire to secure by Letters Patent, is—

1. In a tide-power, a plurality of basins, a chamber, a passage thereto, a float in said chamber, turbines on said float, a chute adjacent said turbines and mounted on said float, a communication between said basins, separate communications from said chamber to each basin, a communication from one of said basins to said passage, and means for permitting access to said chamber.

2. In a tide-power, a plurality of basins having openings in the walls thereof, means for closing said openings, a chamber, a communication between said chamber and said basins turbines in said chamber, a chute having a plurality of openings so as to direct the water to either turbine, and means for conducting the water to one basin or the other.

3. In a tide-power, a plurality of basins, a chamber adjacent thereto, a float in said chamber, turbines on said float, shafts connected with said turbines, grooves in said shafts, pulleys having tongues which enter said grooves, and a chute on said float adapted to move therewith, and having openings for directing the water to either turbine.

4. In a tide-power, a plurality of basins, a chamber, a float therein, strips on said float, guides for said float, turbines on said float, shafts connected with said turbines, guides for said shafts, a chute on said float adapted to move with said float and having a plurality of openings for directing the water to either turbine, and means for controlling the flow of water into said chute.

5. In a tide-power, basins $C'$, $D'$, a gate $P^2$ closing a passage between said basins, a chamber B, a passage J leading thereto, a float C, turbines F and G, a chute U, gates Y and Z, gates $A'$ and $B'$ in the walls of said chamber, gates $F'$, $G'$ and $H'$, an inclosure $K'$, a gate $M'$, and means for allowing water to flow from said chamber.

6. In a tide-power, a plurality of reservoirs, a chamber adjacent thereto, a passage to said chamber, a float in said chamber, a chute, turbines located near said chute, gates between said passage and said chute, measurers attached to said gates, and means for allowing said float to rise and fall, so that when a small amount of water is entering the device, the fall thereof will be greater than when a larger amount of water is entering.

ERNEST MARKMANN.

Witnesses:
JOHN A. WIEDERSHEIM,
WM. C. WIEDERSHEIM.